(12) United States Patent
Kim et al.

(10) Patent No.: US 8,139,855 B2
(45) Date of Patent: Mar. 20, 2012

(54) ILLUMINANT ESTIMATION METHOD, MEDIUM, AND SYSTEM

(75) Inventors: Sung-su Kim, Yongin-si (KR);
Byoung-ho Kang, Yongin-si (KR);
Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1145 days.

(21) Appl. No.: 11/898,056

(22) Filed: Sep. 7, 2007

(65) Prior Publication Data
US 2008/0080764 A1 Apr. 3, 2008

(30) Foreign Application Priority Data
Sep. 28, 2006 (KR) .................. 10-2006-0095021

(51) Int. Cl.
*G06K 9/00* (2006.01)
(52) U.S. Cl. ...................................... 382/167
(58) Field of Classification Search ............... 382/107, 382/162, 167, 209, 254; 358/516, 518; 348/208.4, 348/223.1
See application file for complete search history.

(56) References Cited

U.S. PATENT DOCUMENTS

| | | | | |
|---|---|---|---|---|
| 2003/0146983 | A1* | 8/2003 | Hoshuyama | 348/223.1 |
| 2006/0177127 | A1* | 8/2006 | Sachs et al. | 382/167 |
| 2007/0165945 | A1* | 7/2007 | Goma et al. | 382/167 |

FOREIGN PATENT DOCUMENTS

| | | |
|---|---|---|
| EP | 0 442 269 | 8/1991 |
| EP | 0 663 779 | 7/1995 |
| EP | 1 335 590 | 8/2003 |
| JP | 7-128147 | 5/1995 |
| JP | 2003-348601 | 12/2003 |
| JP | 2004-40417 | 2/2004 |
| KR | 2001-0097060 | 11/2001 |
| KR | 10-2005-0074590 | 7/2005 |

OTHER PUBLICATIONS

European Search Report issued Feb. 11, 2008 in corresponding European Patent Application No. 07116461.0-2202.

* cited by examiner

*Primary Examiner* — Duy M Dang
(74) *Attorney, Agent, or Firm* — Staas & Halsey LLP

(57) ABSTRACT

A color rendering technique, more particularly, an illuminant estimation method, medium, and system estimating an illuminant for white balancing. The illuminant estimation method includes detecting a plurality of valid images from input image data, and determining an illuminant for white balancing based on one or more estimated illuminants that are obtained based on data included in each of the valid images.

38 Claims, 6 Drawing Sheets

ILLUMINANT ESTIMATION METHOD, MEDIUM, AND SYSTEM

CROSS-REFERENCE TO RELATED APPLICATIONS

This application claims priority from Korean Patent Application No. 10-2006-0095021 filed on Sep. 28, 2006 in the Korean Intellectual Property Office, the disclosure of which is incorporated herein by reference in its entirety.

BACKGROUND OF THE INVENTION

1. Field of the Invention

One or more embodiments of the present invention relate to color rendering, and more particularly, to an illuminant estimation method, medium, and system estimating an illuminant for white balancing.

2. Description of the Related Art

Color temperature is a term used to describe the color of light and is typically measured in degrees Kelvin (K). In general, human visual perception is characterized by autonomously adjusting color sensitivity. Thus, the human visual system may not be able to properly detect changes in the color temperature of light. On the other hand, image pickup devices such as cameras or camcorders can precisely sense the color temperatures of illuminants. Thus, images captured under different illuminants by an image pickup device may actually render the same object in different colors.

For example, the color temperature of sunlight on a clear day is high, such that corresponding images captured by an image pickup device will generally appear bluish. On the other hand, the color temperature of sunlight before sunrise or after sunset is low, and corresponding images captured by an image pickup device will generally appear reddish. In order to address this problem, automatic white balancing (AWB) has been suggested. AWB is a technique of correcting color distortions in an image when at least one of R, G, and B components of the image prevails because of the color temperature of an illuminant.

However, conventional white balancing techniques may not be able to perform consistent color rendering on images according to the colors and sizes of objects rendered therein even though the images are captured under the same illuminant.

In addition, the illuminant estimation performance of conventional white balancing techniques may considerably deteriorate, especially when images include no illuminant information or when images only include object colors that are similar to an illuminant.

SUMMARY OF THE INVENTION

One or more embodiments of the present invention include an illuminant estimation method, medium, and system that can improve a performance of color rendering through stable illuminant estimation.

Additional aspects and/or advantages of the invention will be set forth in part in the description which follows and, in part, will be apparent from the description, or may be learned by practice of the invention.

To achieve the above and/or other aspects and advantages, embodiments of the present invention include an illuminant estimation method, including detecting a plurality of valid images out of data of a plurality of input images, with each valid image being a respective current image determined to be definably different from a respective previous image, and determining and outputting an illuminant for white balancing of at least one image of the plurality of images based on at least one estimated illuminant obtained based on at least one of the valid images.

To achieve the above and/or other aspects and advantages, embodiments of the present invention include a system with illuminant estimation, including an image detection module to detect a plurality of valid images out of data of a plurality of input images, with each valid image being a respective current image determined to be definably different from a respective previous image, and an illuminant determination module to determine an illuminant for white balancing of at least one image of the plurality of images based on at least one estimated illuminant obtained based on at least one of the valid images.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
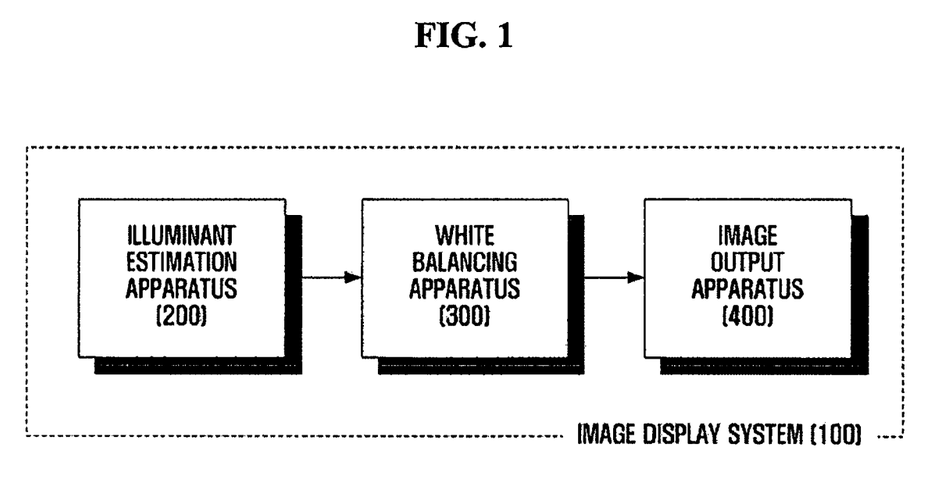
FIG. 1 illustrates an image display system, according to an embodiment of the present invention.

FIG. 1 illustrates an image display system 100, according to an embodiment of the present invention. Referring to FIG. 1, the image display system 100 may include an illuminant estimation apparatus 200, a white balancing apparatus 300, and an image output apparatus 400. The image display system 100 may include or be a digital still camera, a digital video camcorder, and a digital surveillance camera, and the illuminant estimation apparatus 200, white balancing apparatus 300, and image output apparatus 400 may equally be implemented as systems, though the present application will below refer to the same as apparatuses for simplicity sake.

Thus, here the apparatus/system 200 may detect a plurality of valid images from an input image data, and identify an illuminant for white balancing based on one or more estimated illuminants that are obtained based on data included in each of the valid images. The apparatus 200 will be described below in greater detail with reference to FIG. 2.

The white balancing apparatus/system 300 may perform white balancing on the input image data using the illuminant identified by the illuminant estimation apparatus 200. As white balancing is known, a further detailed description thereof will be skipped.

The image output apparatus/system 400 may display an image obtained through white balancing performed by the white balancing apparatus 300, for example. As only an example, the image output apparatus 400 may be embodied as a liquid crystal display (LCD), a plasma display panel (PDP), a light emitting diode (LED), an organic LED (OLED), or a flexible display.

Figure 2:
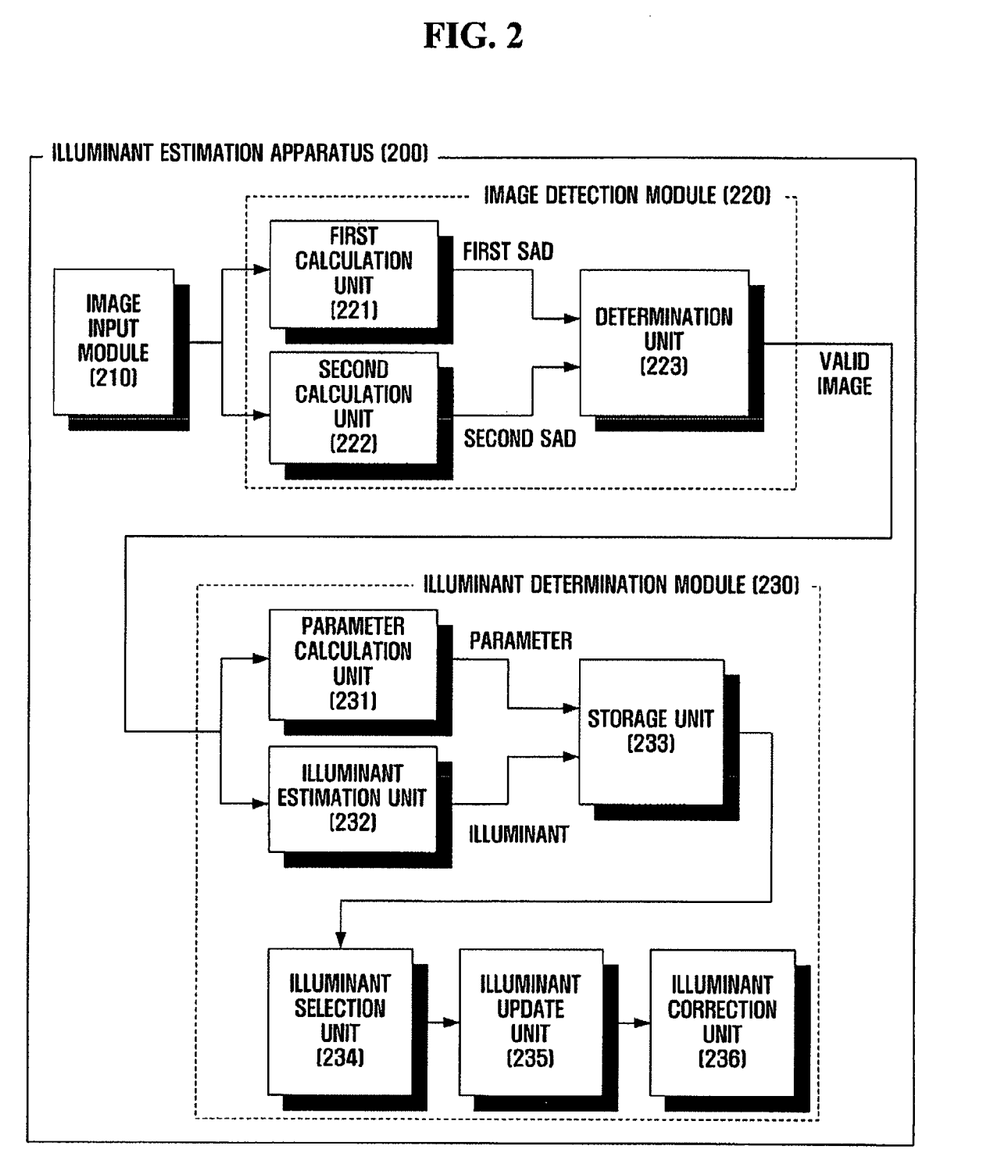
FIG. 2 illustrates an illuminant estimation apparatus/system, according to an embodiment of the present invention.

FIG. 2 illustrates an illuminant estimation apparatus/system 200, according to an embodiment of the present invention. Referring to FIG. 2, the illuminant estimation apparatus 200 may include an image input module 210, an image detection module 220, and an illuminant determination module 230, for example.

The image input module 210 may receive input image data from a predetermined image source, and output a plurality of sub-pixels (i.e., R, G, and B components) that make up the input image data. The input image data may include a plurality of RGB signals or other signals, for example. If the input image data is of an RGB format, the image input module 210 may convert the input image data into image data including a plurality of luminance signals, e.g., image data having a YCrCb format, noting that alternative embodiments are equally available.

The image detection module 220 may compare a plurality of images included in the input image data, and detect one or more images having different motion information and/or different illuminant information from their respective previous images. For this, the image detection module 220 may include a first calculation unit 221, a second calculation unit 222, and a determination unit 223, for example.

The first calculation unit 221 calculates a first parameter for detecting whether an image that has different motion information from a previous image. As only an example, the first parameter may include the sum of absolute differences (SAD, hereinafter referred to as the first SAD) between the luminance of a current image and the luminance of a previous image. The detection of an image having different motion information from its previous image based on first SAD will hereinafter be described in greater detail. The first calculation unit 221 may calculate luminance differences between a plurality of pixels of a current image and respectively corresponding pixels of a previous image. Thereafter, the first calculation unit 221 may add up the absolute values of the luminance differences, thereby obtaining the first SAD regarding the current image. If the first SAD regarding the current image is greater than a first threshold, the determination unit 223 may determine that the current image has different motion information from the previous image.

The second calculation unit 222 may calculate a second parameter for detecting whether an image has different illuminant information from its previous image. As only an example, the second parameter may include a normalized SAD (hereinafter referred to as the second SAD). The second SAD may be a SAD obtained when the average luminance of a current image and the average luminance of a previous image are standardized.

Such a detection of an image having different illuminant information from its previous image based on the second SAD will hereinafter be described in greater detail. The second calculation unit 222 may calculate the average luminance, for example, of a current image and the average luminance of a previous image. Then, the second calculation unit 222 may standardize the average luminance of the current image and the average luminance of the previous image so that the average luminance of the current image and the average luminance of the previous image become equal. For example, if the average luminance of the current image is 100 and the average luminance of the previous image is 110, the second calculation unit 222 may standardize the average luminance of the current image so that the average luminance of the current image can become the same as the average luminance of the previous image, i.e., 110. Alternatively, the second calculation unit 222 may standardize the average luminance of the previous image so that the average luminance of the previous image can become the same as the average luminance of the current image, i.e., 100. Once the average luminance of the current image and the average luminance of the previous image become equal, the second calculation unit 222 may calculate luminance differences between a plurality of pixels of the current image and respectively corresponding pixels of the previous image. Thereafter, the second calculation unit 222 adds up the absolute values of the luminance differences, thereby obtaining second SAD regarding the current image. If the second SAD regarding the current image is greater than a second threshold, the determination unit 223 may determine that the current image has different illuminant information from the previous image As described above, the determination unit 223 may detect whether the current image has different motion information from its previous image by comparing the first SAD with the first threshold or may detect whether the current image has different illuminant information from its previous image by comparing the second SAD with the second threshold.

Alternatively, the determination unit 223 may detect whether the current image has different motion information or different illuminant information from its previous image by comparing the first and second SADs. In detail, if the result of such a comparison indicates that the first and second SADs are similar and are both greater than the first threshold, then the determination unit 223 may determine that the current image has different motion information from the previous image. If the result of comparison indicates that the first SAD is different from the second SAD and is greater than the first threshold, then the determination unit 223 may determine that the current image has different illuminant information from the previous image. Here, an image detected by the image detection module 220, e.g., an image with a sufficiently definable change from at least one previous image, will be understood to be defined as a "valid" image.

The illuminant determination module 230 may determine an illuminant for white balancing based on a plurality of estimated illuminants that are obtained based on data included in each valid image. For this, the illuminant determination module 230 includes a parameter calculation unit 231, an illuminant estimation unit 232, a storage unit 233, an illuminant selection unit 234, an illuminant update unit 235, and an illuminant correction unit 236, for example.

The parameter calculation unit 231 may calculate a parameter that can represent each valid image provided by the image detection module 220, for example. In an embodiment, the parameter that can represent each valid image may correspond to luminance variance, chrominance variance, chrominance change rate, and achromatic axis gradient, for example.

Luminance variance is luminance distribution information of a valid image. A valid image with large luminance variance can be interpreted as including a number of surfaces having different reflectivity coefficients. For a better understanding of luminance variance, the definition of the term "variance" should be identified. Here, "variance" is the average squared deviation of each variable from its mean. When variance is low, most variable values are located near their mean, i.e., the distribution of variable values is uniform. On the other hand, when variance is high, most variable values differ greatly from their mean, i.e., the distribution of variable values is not uniform.

In the meantime, an object may have a number of surfaces with different reflectivity coefficients. The luminance variance of an image that renders an object having a considerable number of surfaces with different reflectivity coefficients is greater than the luminance variance of an image that renders an object having fewer surfaces with different reflectivity coefficients. Given all this, an image having a high luminance variance can be interpreted as being an image having a considerable number of surfaces with different reflectivity coefficients.

Chrominance variance indicates luminance distribution information of a valid image. An image with a high chrominance variance, like an image with a high luminance variance, can be interpreted as being an image comprising a considerable number of surfaces with different reflectivity coefficients.

Chrominance change rate indicates the rate of change of the chrominance of a valid image, i.e., how much the chrominance of a current valid image varies from the chrominance of a previous valid image. In the situation when the chrominance of the current valid image is higher than the chrominance of the previous valid image, the chrominance change rate of the current valid image is the same as the degree to which the chrominance of the current valid image increases from the chrominance of the previous valid image. On the other hand, in the situation when the chrominance of the current valid image is lower than the chrominance of the previous valid image, the chrominance change rate of the current valid image is the same as the degree to which the chrominance of the current valid image decreases from the chrominance of the previous valid image. The interval between the current valid image and the previous valid image can be arbitrarily determined. Here, the interval between the current valid image and the previous valid image may be the interval between a pair of adjacent frames. In detail, the term "input image data", herein, indicates a moving picture, and each valid image extracted from input image data may be regarded as a frame. Thus, the interval between the current valid image and the previous valid image can be regarded as the interval between a pair of adjacent frames. The parameter calculation unit 231 may also include a mechanism to adjust the interval between the current valid image and the previous valid image, i.e., the interval between a pair of adjacent frames.

Figure 3:
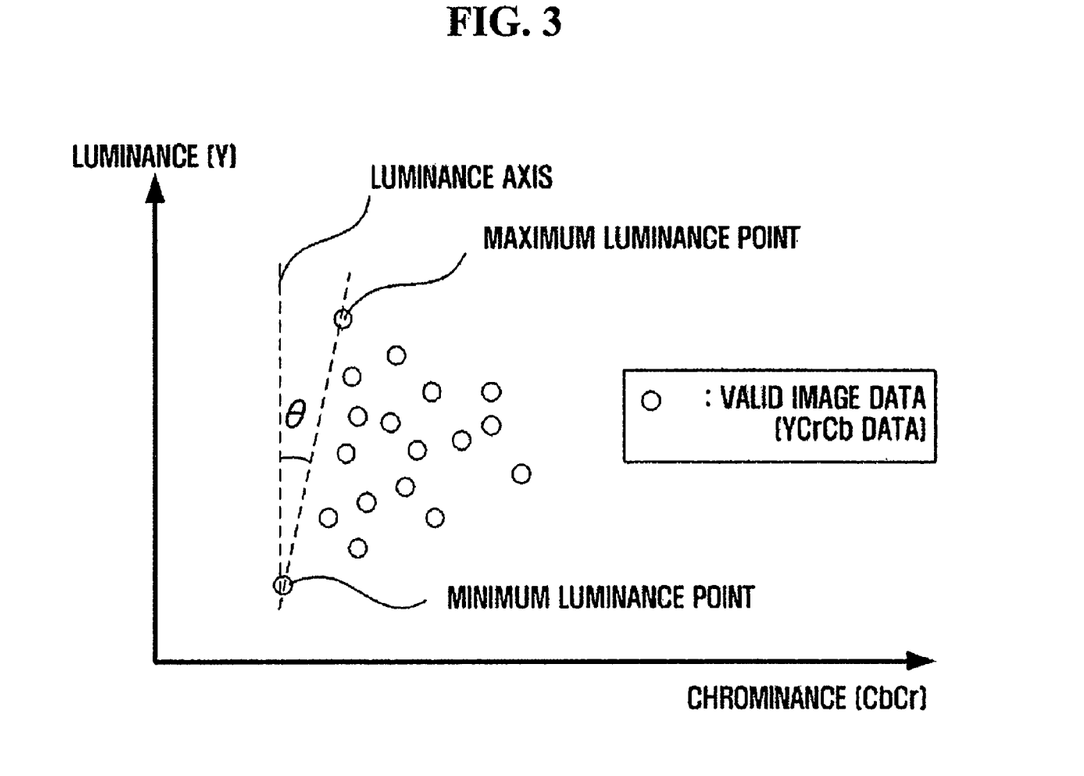
FIG. 3 is a graph for explaining the concept of achromatic axis gradient in a luminance-chroma space.

Achromatic axis gradient is the angle θ between the luminance axis of a luminance-chrominance space and a straight line that is drawn between valid image data (hereinafter referred to as a maximum luminance point) in the luminance-chrominance space with the maximum luminance and valid image data (hereinafter referred to as a minimum luminance point) in the luminance-chrominance space with the minimum luminance. Achromatic axis gradient will become more apparent by referencing FIG. 3.

The aforementioned parameter such as luminance variance, chrominance variance, chrominance change rate, or achromatic axis gradient, for example, can be used to select illuminant information that is needed to perform white balancing from among a plurality of pieces of estimated illuminant information that are respectively obtained from a plurality of valid images.

Referring again to FIG. 2, the illuminant estimation unit 232 may estimate the illuminant of a valid image based on data included in the valid image. If more than one valid image is provided by the image detection module 220, then the illuminant estimation unit 232 may estimate the illuminant of each of the provided valid images. Estimation of an illuminant of an image based on data included in the image is known, and thus, a further detailed description thereof will be skipped.

The storage unit 233 may store the parameter that can represent each valid image, and information regarding each estimated illuminant that is obtained based on data included in each valid image. The storage unit 233 can be embodied as a nonvolatile memory device such as a cache, a read only memory (ROM), a programmable ROM (PROM), an erasable PROM (EPROM), an electrically EPROM (EEPROM), or a flash memory, a volatile memory device such as a random access memory (RAM), or a storage medium such as a hard disc drive (HDD), for example, noting that alternative embodiments are equally available.

The illuminant selection unit 234 may determine whether the parameter that can represent each valid image such as luminance variance, chrominance variance, chrominance change rate, or achromatic axis gradient satisfies a predefined condition. In addition, the illuminant selection unit 234 may select one or more illuminants respectively corresponding to valid images that satisfy a predefined condition from among the estimated illuminants provided by the illuminant estimation unit 232. A valid image that satisfies such a predefined condition will herein be defined as a "global image."

According to differing embodiments, determination examples of a valid image as a global image will hereinafter be described in greater detail, noting that alternate examples are also available. As one example, a valid image with a luminance variance greater than a predefined threshold may be identified to be a global image. Alternatively, a valid image with a chrominance variance greater than a predefined threshold may be identified to be a global image. Alternatively, a valid image with an achromatic axis gradient less than a predefined threshold may be identified to be a global image. Alternatively, a valid image with a chrominance change rate less than a predefined threshold may be identified to be a global image. As described above, if at least one parameter that represents a valid image satisfies a predefined condition, the valid image can be determined as a global image.

The illuminant update unit 235 may include the number of global images obtained by the illuminant selection unit 234 with a predefined threshold and selectively update an illuminant that is needed to perform white balancing according to the result of the comparison. In detail, if the result of the comparison indicates that the number of global images obtained by the illuminant selection unit 234 is greater than the predefined threshold, then the illuminant update unit 235 may arbitrarily select one of the illuminants selected by the illuminant selection unit 234, i.e., arbitrarily select one of the illuminants of the global images obtained by the illuminant selection unit 234, and update a previously stored illuminant with the arbitrarily selected illuminant.

Alternatively, the illuminant update unit 235 may calculate the median of the illuminants selected by the illuminant selection unit 234 (i.e., the median of the illuminants of the global images obtained by the illuminant selection unit 234), and update the previously stored illuminant with the result of the calculation.

On the other hand, if the result of the comparison indicates that the number of global images obtained by the illuminant selection unit 234 is less than the predefined threshold, then the illuminant update unit 235 may maintain the previously stored illuminant.

The illuminant correction unit 236 may correct an updated illuminant provided by the illuminant update unit 235. In detail, in one embodiment, the illuminant correction unit 236 may correct the updated illuminant so that the updated illuminant can have an RGB ratio of 1:1:1 when being converted to an RGB format.

Figure 4:
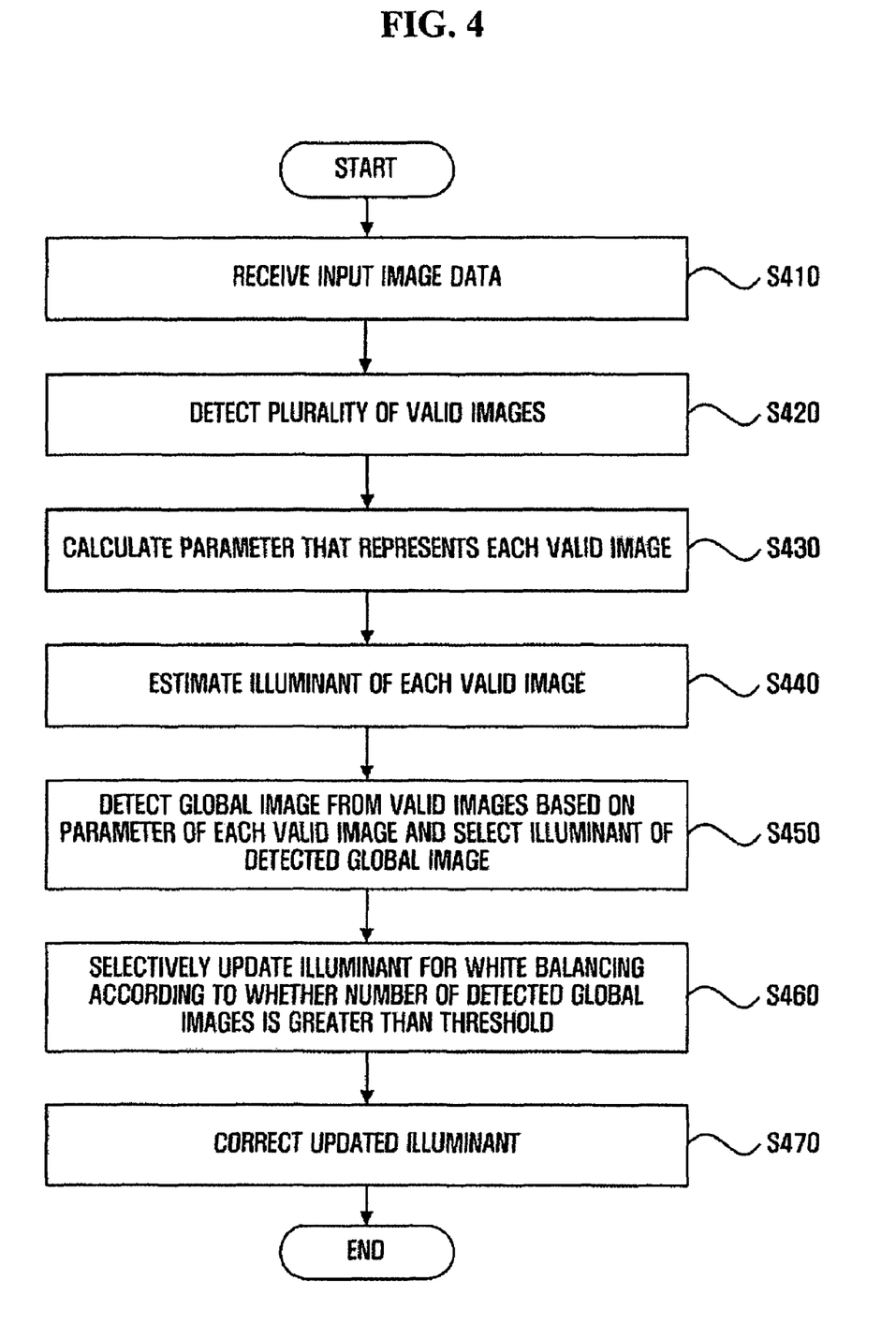
FIG. 4 illustrates an illuminant estimation method, according to an embodiment of the present invention.

FIG. 4 illustrates an illuminant estimation method, according to an embodiment of the present invention.

Referring to FIG. 4, in operation S410, input image data may be received, e.g., by the image input module 210.

In operation S420, a plurality of valid images may be detected from the input image data, e.g., by the image detection module 220. In other words, the image detection module 220 may detect one or more images having different motion information or different illuminant information from their respective previous images from the input image data. Operation S420 involves calculating first and second SADs regarding a current image and determining whether the current image is a valid image by comparing the first and second SADs with respective corresponding thresholds.

The first SAD regarding the current image may be obtained by adding up the absolute values of luminance differences between a plurality of pixels of the current image and respective corresponding pixels of a previous image. As a further example, the second SAD regarding the current image can be obtained by standardizing the average luminance of the current image and the average luminance of the previous image and then adding up the absolute values of luminance differences between the pixels of the current image and the respective pixels of the previous image.

In operation S430, a parameter that can represent each of the valid images, such as provided by the image detection module 220, may be calculated, e.g., by the parameter calculation unit 231. Examples of the parameter include at least one of luminance variance, chrominance variance, chrominance change rate, and achromatic axis gradient, noting that alternatives are equally available.

In operation S440, the illuminant of each of the valid images may be estimated based on data included in a corresponding valid image, e.g., by the illuminant estimation unit 232.

In operation S450, it may be determined whether a parameter of a valid image satisfies a predefined condition, the valid image may be identified to be a global image, and the illuminant of the valid image may be selected if the parameter of the valid image satisfies the predefined condition, e.g., by the illuminant selection unit 234. The predefined condition may be whether chroma change is less than a predefined threshold, whether luminance variance is greater than a predefined threshold, whether chrominance variance is greater than a predefined threshold, or whether achromatic axis gradient is less than a predefined threshold, for example.

In operation S460, the number of global images obtained in operation S450 may be compared with a predefined threshold and an illuminant that is needed to perform white balancing may be selectively updated according to the result of the comparison, e.g., by the illuminant update unit 235. Operation S460 involves calculating the median of the illuminants of the global images obtained in operation S450 and updating a previously stored illuminant with the result of the calculation if the result of the comparison indicates that the number of global images obtained in operation S450 is greater than the predefined threshold; and maintaining the previously stored illuminant if the result of the comparison indicates that the number of global images obtained in operation S450 is less than the predefined threshold.

In operation S470, an updated illuminant obtained in operation S460 may be corrected, e.g., by the illuminant correction unit 236.

In an embodiment, once the updated illuminant obtained in operation S460 is corrected, the white balancing apparatus 300 can perform white balancing on the input image data according to the corrected illuminant. Then, an image obtained by the white balancing can be displayed by the image output apparatus 400.

Here, as an example, the illuminant estimation apparatus 200 may selectively update illuminant information that is needed to perform white balancing based on whether the number of global images obtained by the illuminant selection unit 234 is greater than a predefined threshold. An illuminant estimation apparatus/system which decides whether to update illuminant information, used to perform white balancing, based on a parameter that can represent each valid image will hereinafter be described in greater detail with reference to FIG. 5.

Figure 5:
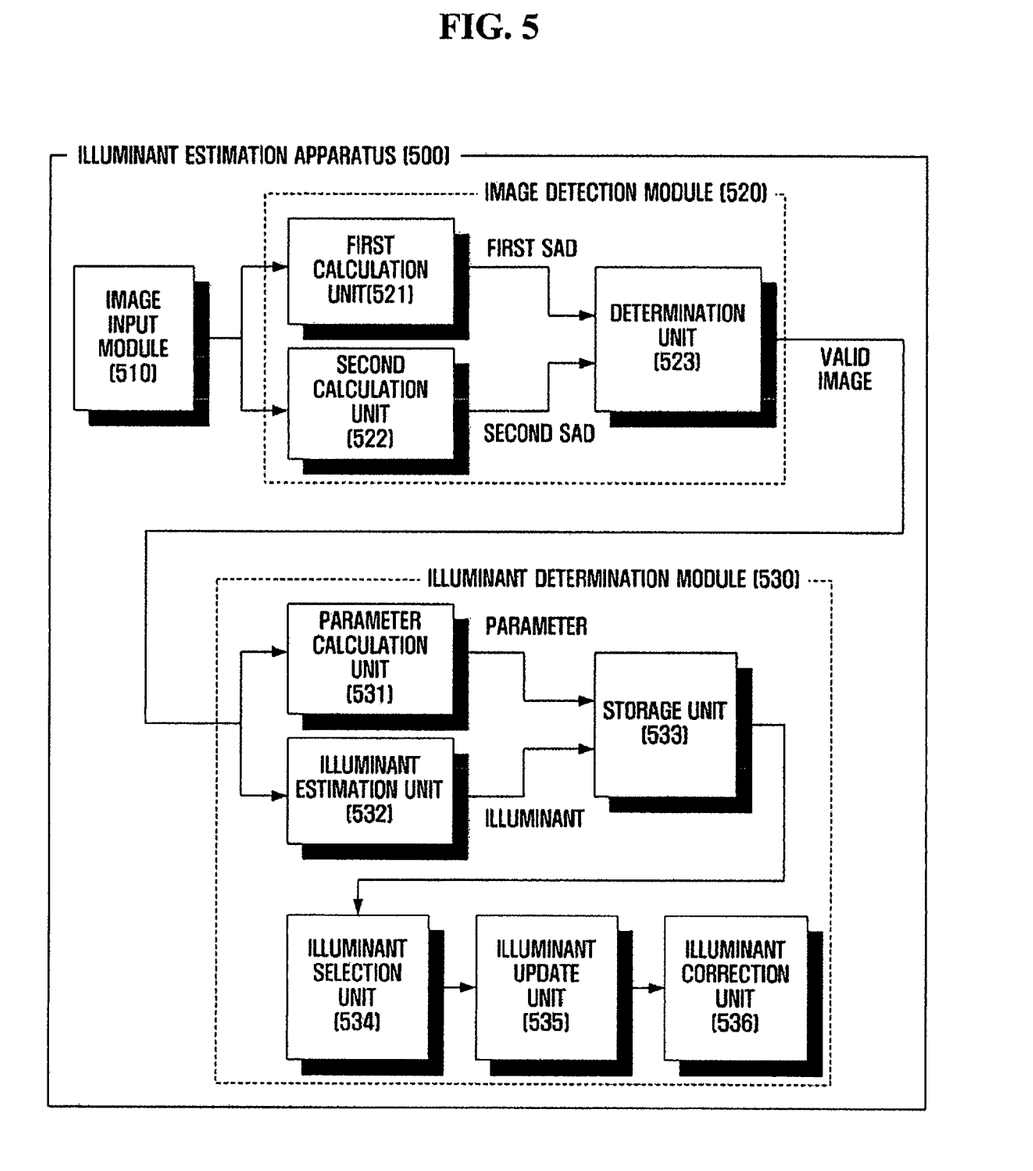
FIG. 5 illustrates an illuminant estimation apparatus/system, according to a embodiment of the present invention.

FIG. 5 illustrates an illuminant estimation apparatus/system 500, according to an embodiment of the present invention. Referring to FIG. 5, an image input module 510, a first calculation unit 521, a second calculation unit 522, a determination unit 523, a parameter calculation unit 531, an illuminant estimation unit 532, a storage unit 533, and an illuminant correction unit 536 may be considered similar to their respective counterparts illustrated in FIG. 2, and thus, further detailed descriptions thereof will be skipped.

If a parameter that represents a valid image satisfies a predefined condition, then the illuminant selection unit 534 may select an illuminant corresponding to the valid image from among a plurality of estimated illuminants provided by the illuminant estimation unit 532. For example, the illuminant selection unit 534 may select an illuminant corresponding to a valid image with a chrominance change rate less than a predefined threshold from among the estimated illuminants provided by the illuminant estimation unit 532.

Alternatively, the illuminant selection unit 534 may select an illuminant corresponding to a valid image with a luminance variance greater than a predefined threshold from among the estimated illuminants provided by the illuminant estimation unit 532, for example.

Still alternatively, the illuminant selection unit 534 may select an illuminant corresponding to a valid image with a chrominance variance greater than a predefined threshold from among the estimated illuminants provided by the illuminant estimation unit 532.

Still alternatively, the illuminant selection unit 534 may select an illuminant corresponding to a valid image with an achromatic axis gradient less than a predefined threshold from among the estimated illuminants provided by the illuminant estimation unit 532, noting again that alternate embodiments are equally available.

The illuminant update unit 535 may update illuminant information that can be used to perform white balancing according to the illuminant selected by the illuminant selection unit 534. In detail, if the illuminant selection unit 534 selects more than one illuminant, from among the estimated illuminants provided by the illuminant estimation unit 532, then the illuminant update unit 535 may calculate the median of the selected illuminants, and update a previously stored illuminant with the result of the calculation.

Figure 6:
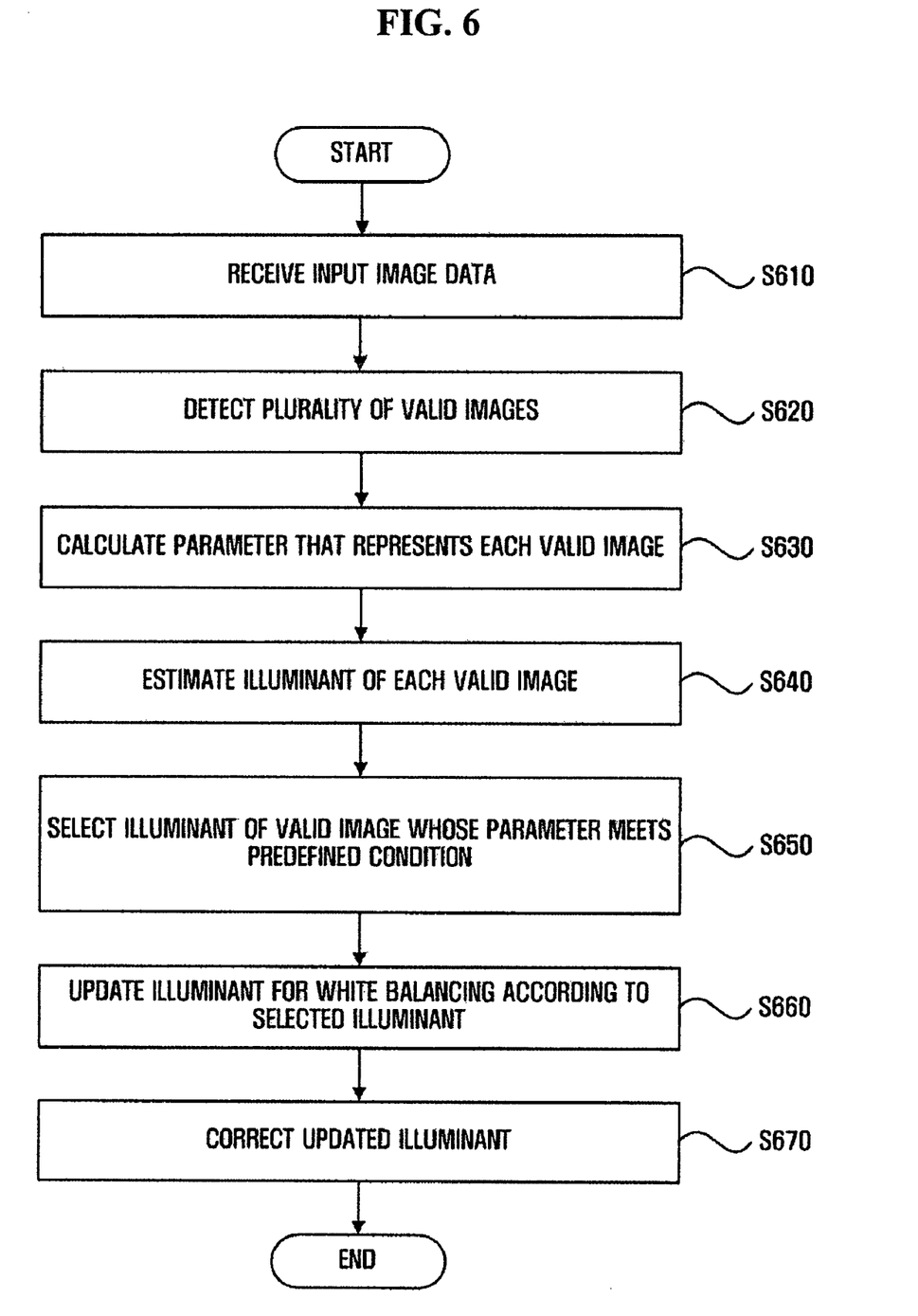
FIG. 6 illustrates another illuminant estimation method, according to an embodiment of the present invention.

FIG. 6 illustrates an illuminant estimation method, according to an embodiment of the present invention.

Referring to FIG. 6, in operation S610, input image data may be received, e.g., by the image input module 510.

In operation S620, a plurality of valid images may be detected from the input image data, e.g., by an image detection module 520. For example, in an embodiment, the image detection module 520 may detect one or more images having different motion information or different illuminant information from their respective previous images from the input image data. Operation S620 involves calculating first and second SADs regarding a current image and determining whether the current image is a valid image by comparing the first SAD and the second SAD with respective corresponding thresholds.

The first SAD regarding the current image may be obtained by adding up the absolute values of luminance differences between a plurality of pixels of the current image and respective corresponding pixels of a previous image, for example.

The second SAD regarding the current image may be obtained by standardizing the average luminance of the current image and the average luminance of the previous image and then adding up the absolute values of luminance differences between the pixels of the current image and the respective pixels of the previous image, also as an example.

In operation S630, a parameter that can represent each of the valid images, such as provided by the image detection module 520, may be calculated, e.g., by the parameter calculation unit 531. Examples of the parameter include luminance variance, chrominance variance, chrominance change rate, and achromatic axis gradient, noting that alternatives are equally available.

In operation S640, the illuminant of each of the valid images may be estimated based on data included in a corresponding valid image, e.g., by the illuminant estimation unit 532.

In operation S650, it may be determined whether a parameter of a valid image satisfies a predefined condition, and the illuminant of the valid image may be selected, if the parameter of the valid image satisfies the predefined condition, e.g., by the illuminant selection unit 534. The predefined condition may be whether chroma change is less than a predefined threshold, whether luminance variance is greater than a predefined threshold, whether chrominance variance is greater than a predefined threshold, or whether achromatic axis gradient is less than a predefined threshold, again noting that alternatives are equally available.

In operation S660, illuminant information that is needed to perform white balancing may be updated according to the illuminant selected in operation S650, e.g., by the illuminant update unit 535. If more than one illuminant is selected in operation S650, operation S660 may involve calculating the median of the selected illuminants, and updating a previously stored illuminant with the result of the calculation.

In operation S670, an updated illuminant obtained in operation S660, for example, may be corrected, e.g., by the illuminant correction unit 536.

In one embodiment, once the updated illuminant obtained in operation S660 is corrected, the white balancing apparatus 300 may perform white balancing on the input image data according to the corrected illuminant. Then, an image obtained by the white balancing can be displayed by the image output apparatus 400.

The term "module", as potentially used herein, means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operability provided for in the components and modules may be combined into fewer components and modules or further separated into additional components and modules.

Embodiments of the present invention may have been described above with reference to flowchart illustrations of user interfaces, methods, and/or computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus or system, create mechanisms for implementing the operations specified in the flowchart block or blocks.

Further, each block of the flowchart illustrations may represent a module, segment, or portion of code, which may include one or more executable instructions for implementing the specified logical operation(s). It should also be noted that in some alternative implementations, the operations noted in the blocks may occur out of the order. For example, two blocks shown in succession may in fact be executed substantially concurrently or the blocks may sometimes be executed in the reverse order, depending upon the operations involved.

With that in mind, and in addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, it is possible to enhance the precision of image processing that implements illuminant estimation and the performance of color rendering by correcting illuminant estimation errors that may occur in connection with input image data having no illuminant information or having illuminant information that is similar to object colors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An illuminant estimation method, comprising:
   detecting, using at least one processing device, a plurality of valid images out of data of a plurality of input images so that each valid image is a respective current image whose calculated difference from a respective previous image is determined, in the detecting of the plurality of valid images, to meet a respective minimum threshold; and
   determining and outputting an illuminant for white balancing of at least one image of the plurality of images based on at least one estimated illuminant obtained based on respective comparisons of calculated variance indicators of one or more of the detected valid images, after the detection of the valid images.

2. The illuminant estimation method of claim 1, wherein the detecting of the plurality of valid images further comprises detecting images from the plurality of input images that have determined different motion information from respective previous images that meet respective minimum motion information thresholds and/or images have determined different illuminant information from respective previous images that meet respective minimum illuminant difference thresholds.

3. The illuminant estimation method of claim 2, wherein the detecting of the plurality of valid images comprises:
   calculating luminance differences between a plurality of pixels of a current image and corresponding pixels of a previous image;
   calculating a first sum of absolute differences (SAD) by summing absolute values of the calculated luminance differences; and
   determining the current image to be a valid image if the first SAD meets a predefined threshold.

4. The illuminant estimation method of claim 2, wherein the detecting of the plurality of valid images comprises:
   standardizing an average luminance of a previous image and an average luminance of a current image;
   calculating luminance differences between a plurality of pixels of the current image and corresponding pixels of the previous image;
   calculating a second sum of absolute differences (SAD) by summing absolute values of the calculated luminance differences; and
   determining the current image to be a valid image if the second SAD meets a predefined threshold.

5. At least one non-transitory computer readable medium comprising computer readable code to control at least one processing element to implement the method of claim 1.

6. The illuminant estimation method of claim 1, wherein the determining of the illuminant for the white balancing comprises:
   estimating an illuminant for each of the valid images based on data included in a corresponding valid image;
   calculating a median of estimated illuminants; and
   updating the illuminant for the white balancing based on a result of the calculation of the median.

7. The illuminant estimation method of claim 6, further comprising:
   calculating a parameter that represents a respective valid image; and
   selecting an illuminant for the valid image if the parameter that represents the respective valid image satisfies a predefined condition.

8. The illuminant estimation method of claim 7, wherein the parameter comprises at least one of luminance variance, chrominance variance, chrominance change rate, and achromatic axis gradient.

9. The illuminant estimation method of claim 6, further comprising:
   calculating a parameter that represents a respective valid image;
   determining the respective valid image to be a respective global image if the parameter that represents the respective valid image satisfies a predefined condition; and
   selecting illuminants for determined global images if a number of determined global images is greater than a predefined threshold.

10. The illuminant estimation method of claim 9, wherein the parameter comprises at least one of luminance variance, chrominance variance, chrominance change rate, and achromatic axis gradient.

11. The illuminant estimation method of claim 6, further comprising correcting the updated illuminant.

12. An illuminant estimation method, comprising:
    detecting, using at least one processing device, a plurality of valid images out of data of a plurality of input images, with each valid image being a respective current image determined to be definably different from a respective previous image; and
    determining and outputting an illuminant for white balancing of at least one image of the plurality of images based on at least one estimated illuminant obtained based on at least one of the valid images,
    wherein the valid images comprise images having different motion information from respective previous images and/or images having different illuminant information from respective previous images, and
    wherein the detecting of the plurality of valid images comprises:
    calculating luminance differences between a plurality of pixels of a current image and corresponding pixels of a previous image;
    calculating a first sum of absolute differences (SAD) by summing absolute values of the calculated luminance differences; and
    determining the current image to be a valid image if the first SAD meets a predefined threshold.

13. An illuminant estimation method, comprising:
    detecting, using at least one processing device, a plurality of valid images out of data of a plurality of input images, with each valid image being a respective current image determined to be definably different from a respective previous image; and
    determining and outputting an illuminant for white balancing of at least one image of the plurality of images based on at least one estimated illuminant obtained based on at least one of the valid images,
    wherein the valid images comprise images having different motion information from respective previous images and/or images having different illuminant information from respective previous images, and
    wherein the detecting of the plurality of valid images comprises:
    standardizing an average luminance of a previous image and an average luminance of a current image;
    calculating luminance differences between a plurality of pixels of the current image and corresponding pixels of the previous image;

calculating a second sum of absolute differences (SAD) by summing absolute values of the calculated luminance differences; and determining the current image to be a valid image if the second SAD meets a predefined threshold.

14. An illuminant estimation method, comprising:

detecting, using at least one processing device, a plurality of valid images out of data of a plurality of input images, with each valid image being a respective current image determined to be definably different from a respective previous image; and determining and outputting an illuminant for white balancing of at least one image of the plurality of images based on at least one estimated illuminant obtained based on at least one of the valid images, wherein the determining of the illuminant for the white balancing comprises:

estimating an illuminant for each of the valid images based on data included in a corresponding valid image;

calculating a median of estimated illuminants; and updating the illuminant for the white balancing based on a result of the calculation of the median.

15. The illuminant estimation method of claim 14, further comprising:

calculating a parameter that represents a respective valid image; and selecting an illuminant for the valid image if the parameter that represents the respective valid image satisfies a predefined condition.

16. The illuminant estimation method of claim 15, wherein the parameter comprises at least one of luminance variance, chrominance variance, chrominance change rate, and achromatic axis gradient.

17. The illuminant estimation method of claim 14, further comprising:

calculating a parameter that represents a respective valid image;

determining the respective valid image to be a respective global image if the parameter that represents the respective valid image satisfies a predefined condition; and selecting illuminants for determined global images if a number of determined global images is greater than a predefined threshold.

18. The illuminant estimation method of claim 17, wherein the parameter comprises at least one of luminance variance, chrominance variance, chrominance change rate, and achromatic axis gradient.

19. The illuminant estimation method of claim 14, further comprising correcting the updated illuminant.

20. A system, including at least one processing device, with illuminant estimation, comprising:

an image detection module, using the at least one processing device, to detect a plurality of valid images out of data of a plurality of input images so that each valid image is a respective current image whose calculated difference from a respective previous image is determined, in the detecting of the plurality of valid images, to meet a respective minimum threshold; and an illuminant determination module to determine an illuminant for white balancing of at least one image of the plurality of images based on at least one estimated illuminant obtained based on respective comparisons of calculated variance indicators of one or more of the detected valid images, after the detection of the valid images.

21. The system of claim 20, wherein the detection of the plurality of valid images further comprises detecting images from the plurality of input images that have determined different motion information from respective previous images that meet respective minimum motion information thresholds and/or images have determined different illuminant information from respective previous images that meet respective minimum illuminant difference thresholds.

22. The system of claim 21, wherein the image detection module comprises:

a first calculation unit to calculate luminance differences between a plurality of pixels of a current image and corresponding pixels of a previous image, and to calculate first a sum of absolute differences (SAD) by summing absolute values of the calculated luminance differences; and a determination unit to determine the current image to be a valid image if the first SAD meets a predefined threshold.

23. The system of claim 21, wherein the image detection module comprises:

a second calculation unit to standardize an average luminance of a previous image and an average luminance of a current image, calculate luminance differences between a plurality of pixels of the current image and corresponding pixels of the previous image, and calculate a second sum of absolute differences (SAD) by summing absolute values of the calculated luminance differences; and a determination unit to determines the current image to be a valid image if the second SAD meets a predefined threshold.

24. The system of claim 20, further comprising:

a white balancing unit to perform the white balancing based upon the determined illuminant for the white balancing; and an image output unit to output a result of the white balancing unit.

25. The system of claim 20, wherein the illumination determination module comprises:

an illuminant estimation unit to estimate an illuminant for each of the valid images based on data included in a corresponding valid image; and an illuminant update unit to calculate a median of estimated illuminants, and to update the illuminant for the white balancing with a result of the calculation of the median.

26. The system of claim 25, wherein the illumination determination module further comprises an illumination selection unit to select an illuminant of a valid image if a parameter that represents the valid image satisfies a predefined condition.

27. The system of claim 26, wherein the parameter comprises at least one of luminance variance, chrominance variance, chrominance change rate, and achromatic axis gradient.

28. The system of claim 25, wherein the illuminant determination module comprises an illuminant selection unit to determine a valid image to be a global image if a parameter that represents the valid image satisfies a predefined condition, and to select illuminants for global images obtained by the determination of the valid image to be the global image if a number of respective determined global images meets a predefined threshold.

29. The system of claim 28, wherein the parameter comprises at least one of luminance variance, chrominance variance, chrominance change rate, and achromatic axis gradient.

30. The system of claim 25, where the illuminant determination module further comprises an illuminant correction unit to correct the updated illuminant.

31. A system, including at least one processing device, with illuminant estimation, comprising:
- an image detection module, using the at least one processing device, to detect a plurality of valid images out of data of a plurality of input images, with each valid image being a respective current image determined to be definably different from a respective previous image; and
- an illuminant determination module to determine an illuminant for white balancing of at least one image of the plurality of images based on at least one estimated illuminant obtained based on at least one of the valid images,
- wherein the valid images comprise images having different motion information from respective previous images and/or images having different illuminant information from respective previous images, and
- wherein the image detection module comprises:
- a first calculation unit to calculate luminance differences between a plurality of pixels of a current image and corresponding pixels of a previous image, and to calculate first a sum of absolute differences (SAD) by summing absolute values of the calculated luminance differences; and
- a determination unit to determine the current image to be a valid image if the first SAD meets a predefined threshold.

32. A system, including at least one processing device, with illuminant estimation, comprising:
- an image detection module, using the at least one processing device, to detect a plurality of valid images out of data of a plurality of input images, with each valid image being a respective current image determined to be definably different from a respective previous image; and
- an illuminant determination module to determine an illuminant for white balancing of at least one image of the plurality of images based on at least one estimated illuminant obtained based on at least one of the valid images,
- wherein the valid images comprise images having different motion information from respective previous images and/or images having different illuminant information from respective previous images, and
- wherein the image detection module comprises:
- a second calculation unit to standardize an average luminance of a previous image and an average luminance of a current image, calculate luminance differences between a plurality of pixels of the current image and corresponding pixels of the previous image, and calculate a second sum of absolute differences (SAD) by summing absolute values of the calculated luminance differences; and
- a determination unit to determines the current image to be a valid image if the second SAD meets a predefined threshold.

33. A system, including at least one processing device, with illuminant estimation, comprising:
- an image detection module, using the at least one processing device, to detect a plurality of valid images out of data of a plurality of input images, with each valid image being a respective current image determined to be definably different from a respective previous image; and
- an illuminant determination module to determine an illuminant for white balancing of at least one image of the plurality of images based on at least one estimated illuminant obtained based on at least one of the valid images,
- wherein the illuminant determination module comprises:
- an illuminant estimation unit to estimate an illuminant for each of the valid images based on data included in a corresponding valid image; and
- an illuminant update unit to calculate a median of estimated illuminants, and to update the illuminant for the white balancing with a result of the calculation of the median.

34. The system of claim 33, wherein the illuminant determination module further comprises an illumination selection unit to select an illuminant of a valid image if a parameter that represents the valid image satisfies a predefined condition.

35. The system of claim 34, wherein the parameter comprises at least one of luminance variance, chrominance variance, chrominance change rate, and achromatic axis gradient.

36. The system of claim 33, wherein the illuminant determination module comprises an illuminant selection unit to determine a valid image to be a global image if a parameter that represents the valid image satisfies a predefined condition, and to select illuminants for global images obtained by the determination of the valid image to be the global image if a number of respective determined global images meets a predefined threshold.

37. The system of claim 36, wherein the parameter comprises at least one of luminance variance, chrominance variance, chrominance change rate, and achromatic axis gradient.

38. The system of claim 33, where the illuminant determination module further comprises an illuminant correction unit to correct the updated illuminant.

* * * * *

UNITED STATES PATENT AND TRADEMARK OFFICE
CERTIFICATE OF CORRECTION

PATENT NO. : 8,139,855 B2
APPLICATION NO. : 11/898056
DATED : March 20, 2012
INVENTOR(S) : Sung-su Kim et al.

It is certified that error appears in the above-identified patent and that said Letters Patent is hereby corrected as shown below:

Column 14, Line 38, In Claim 25, delete "illumination" and insert -- illuminant --, therefor.

Column 14, Line 47, In Claim 26, delete "illumination" and insert -- illuminant --, therefor.

Column 14, Line 48, In Claim 26, delete "illumination" and insert -- illuminant --, therefor.

Column 14, Line 65, In Claim 30, delete "where" and insert -- wherein --, therefor.

Column 16, Line 28, In Claim 34, delete "illumination" and insert -- illuminant --, therefor.

Column 16, Line 45, In Claim 38, delete "where" and insert -- wherein --, therefor.

Signed and Sealed this
Twenty-second Day of May, 2012

David J. Kappos
*Director of the United States Patent and Trademark Office*